(12) United States Patent
Little et al.

(10) Patent No.: US 9,345,992 B2
(45) Date of Patent: May 24, 2016

(54) REMOTE SUBMERGED CHAIN CONVEYOR

(71) Applicant: Diamond Power International, Inc., Lancaster, OH (US)

(72) Inventors: Austin Tyler Little, Chillicothe, OH (US); Louis A. Zotti, King of Prussia, PA (US); Tony F. Habib, Lancaster, OH (US); Alan J. Dore, Haverford, PA (US)

(73) Assignee: DIAMOND POWER INTERNATIONAL, INC., Lancaster, OH (US)

(*) Notice: Subject to any disclaimer, the term of this patent is extended or adjusted under 35 U.S.C. 154(b) by 0 days.

(21) Appl. No.: 14/776,800

(22) PCT Filed: Mar. 13, 2014

(86) PCT No.: PCT/US2014/025892
§ 371 (c)(1),
(2) Date: Sep. 15, 2015

(87) PCT Pub. No.: WO2014/151515
PCT Pub. Date: Sep. 25, 2014

(65) Prior Publication Data
US 2016/0001202 A1 Jan. 7, 2016

Related U.S. Application Data

(60) Provisional application No. 61/792,088, filed on Mar. 15, 2013, provisional application No. 61/891,109, filed on Oct. 15, 2013.

(51) Int. Cl.
*B01D 21/04* (2006.01)
*B01D 21/24* (2006.01)
(Continued)

(52) U.S. Cl.
CPC .............. *B01D 21/04* (2013.01); *B01D 21/003* (2013.01); *B01D 21/0033* (2013.01);
(Continued)

(58) Field of Classification Search
CPC ............ B01D 21/003; B01D 21/0033; B01D 21/0042; B01D 21/0045; B01D 21/04; B01D 21/12; B01D 21/2455
USPC .................... 210/803, 521, 526; 44/626, 627
See application file for complete search history.

(56) References Cited

U.S. PATENT DOCUMENTS 2,603,352 A   7/1952   Tromp
2,868,384 A * 1/1959   Puddington ........ B01D 21/0045
                                                    210/521

(Continued)

OTHER PUBLICATIONS

British Coal Corporation, "Removal of Ash from Industrial Boiler Plant using Water or Mechanical Equipment Submerged in Water," Commission of the European Communities, Technical Coal Research, 1992 [Retrieved on Jun. 10, 2014], Retrieved from the Internet: <URL: http://bookshop.europa.eu/>, see entire document, especially pp. 10-14.

(Continued)

*Primary Examiner* — Christopher Upton
(74) *Attorney, Agent, or Firm* — Brinks Gilson & Lione

(57) ABSTRACT

A remote submerged chain conveyor system for separating particles from a coal ash/water slurry from one or more remotely located boiler units. A tank forms an ash holding section, a dewatering section, and an ash settling section. The ash holding section receiving the slurry with first and second opposite ends. The dewatering section dewaters the slurry. The settling zone is an elongated trough connected with the ash holding section at one end with a discharge drain trough at near an opposite end. The tank sections being oriented in a generally linear arrangement wherein a net flow of water from the ash/water slurry is in a direction from the settling zone toward the distal and. A drag chain moves along the ash settling conveying the particles settling from the slurry to the dewatering section.

24 Claims, 17 Drawing Sheets

(51) Int. Cl.
*B01D 21/01* (2006.01)
*B01D 21/00* (2006.01)
*B01D 21/28* (2006.01)
*B01D 21/08* (2006.01)

(52) U.S. Cl.
CPC ....... *B01D 21/0042* (2013.01); *B01D 21/0045* (2013.01); *B01D 21/01* (2013.01); *B01D 21/08* (2013.01); *B01D 21/2405* (2013.01); *B01D 21/2455* (2013.01); *B01D 21/2461* (2013.01); *B01D 21/286* (2013.01)

(56) References Cited

U.S. PATENT DOCUMENTS

| | | | | |
|---|---|---|---|---|
| 3,677,407 | A | | 7/1972 | McIlvaine |
| 3,795,316 | A | | 3/1974 | Wood |
| 3,923,659 | A | * | 12/1975 | Ullrich ............... B01D 21/0045 210/521 |
| 3,932,280 | A | * | 1/1976 | Anderson ............. F23J 1/02 210/526 |
| 4,178,243 | A | * | 12/1979 | Messer ............... B01D 21/0045 210/710 |
| 4,515,607 | A | * | 5/1985 | Wolde-Michael ..... B01D 19/00 210/526 |
| 4,804,147 | A | | 2/1989 | Hooper |
| 5,013,440 | A | | 5/1991 | Maddalena |
| 5,738,782 | A | * | 4/1998 | Schafer ............... B01D 21/2455 210/521 |
| 2002/0139754 | A1 | | 10/2002 | Miller |
| 2004/0159608 | A1 | | 8/2004 | Hoffland |
| 2007/0075024 | A1 | * | 4/2007 | Campbell .......... B01D 21/0045 210/521 |
| 2009/0314726 | A1 | * | 12/2009 | Ng ..................... B01D 21/2455 210/803 |
| 2010/0181537 | A1 | | 7/2010 | Tsang et al. |
| 2011/0226194 | A1 | | 9/2011 | Mooney |

OTHER PUBLICATIONS

United States Patent and Trademark Office, International Search Report of International Application No. PCT/US2014/025892, mailed on Jul. 11, 2014 (1 page).

* cited by examiner

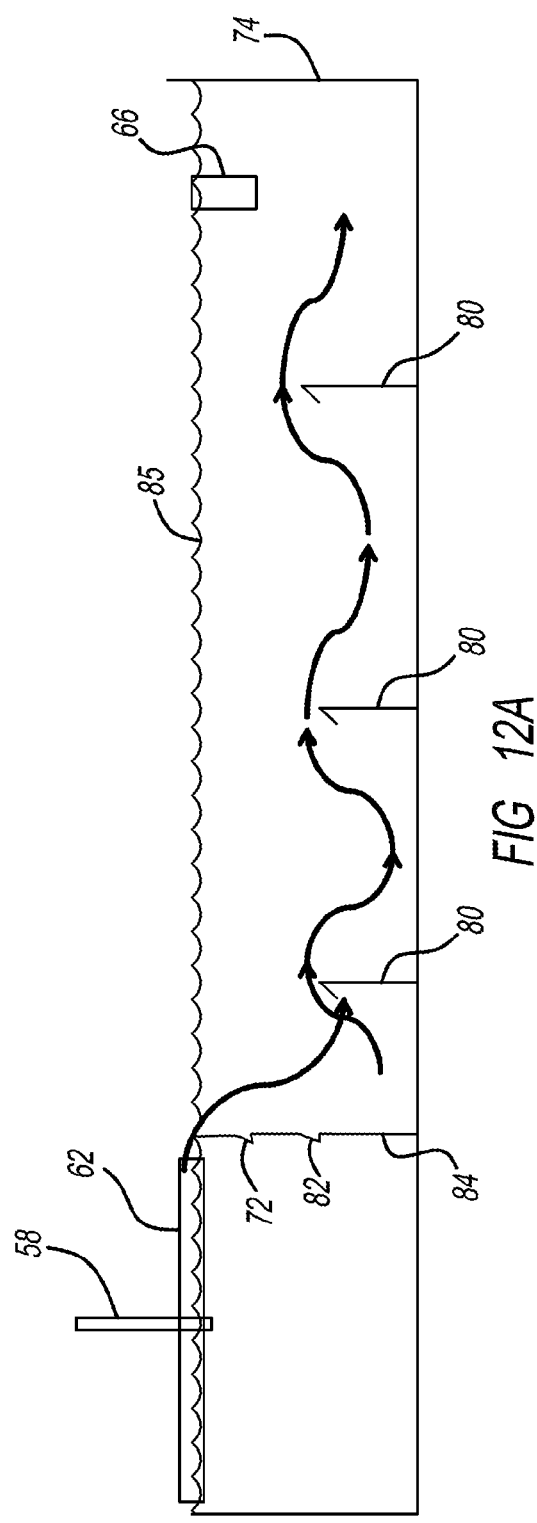
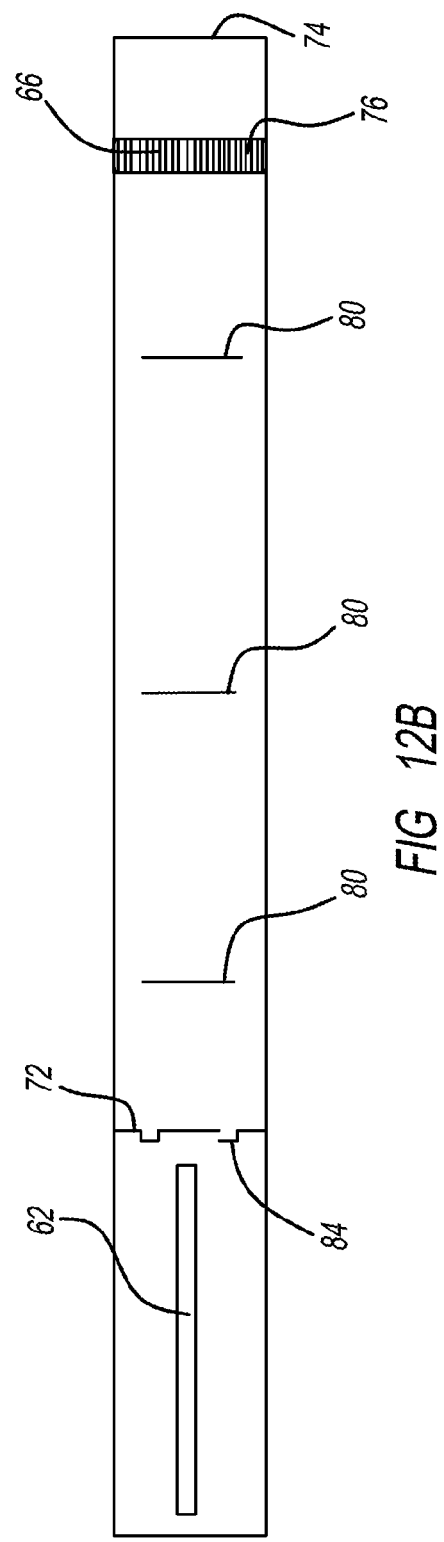
FIG 12A
FIG 12B

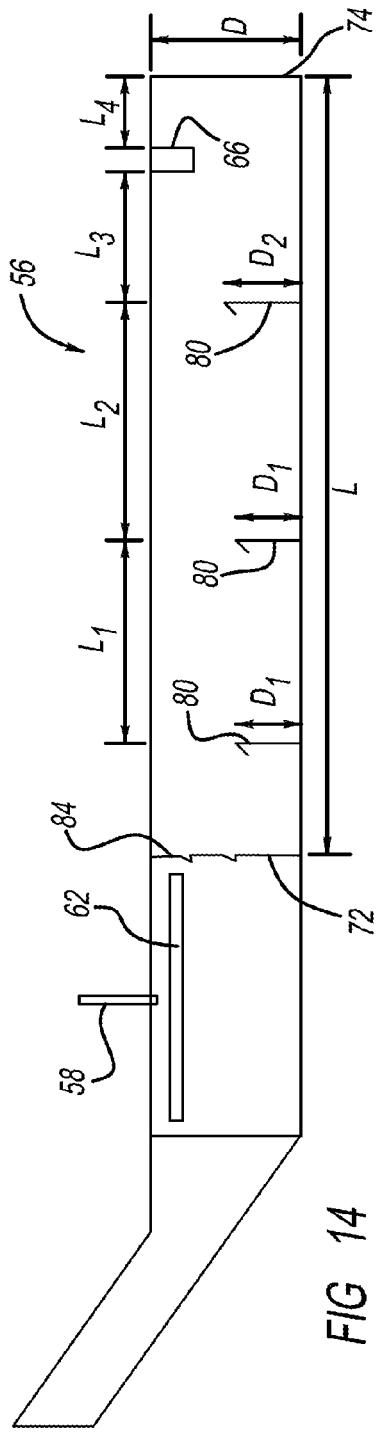
FIG 14
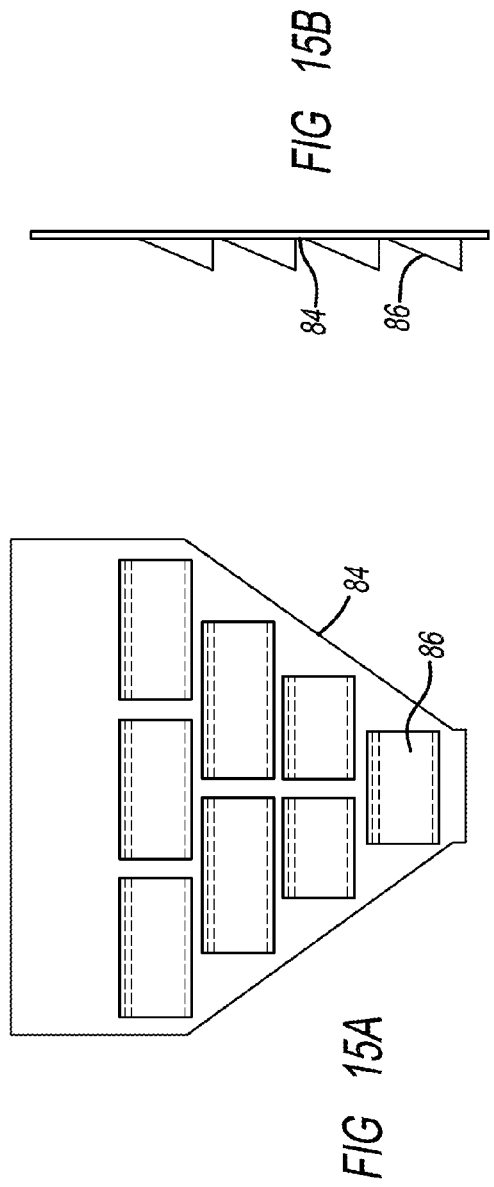
FIG 15A
FIG 15B

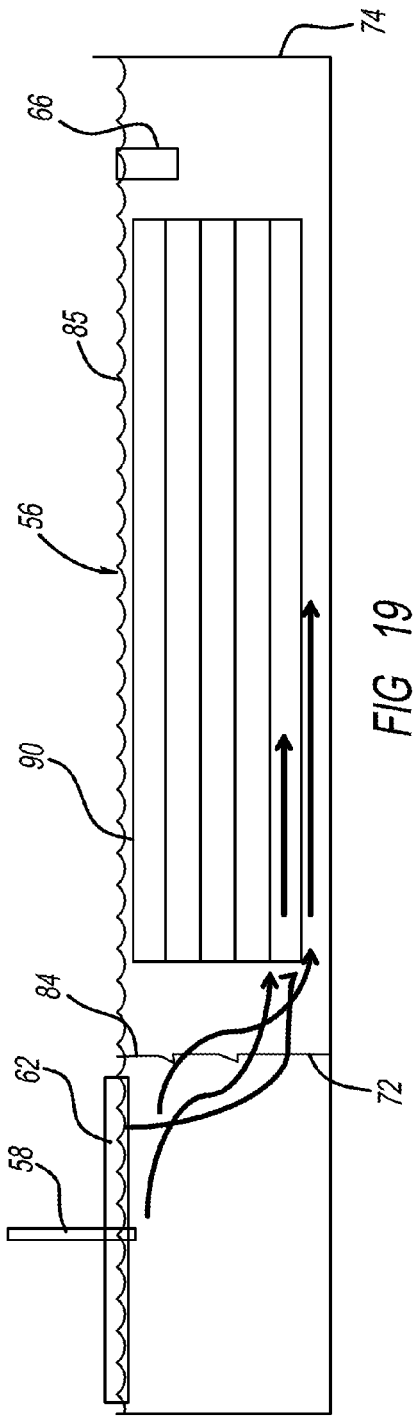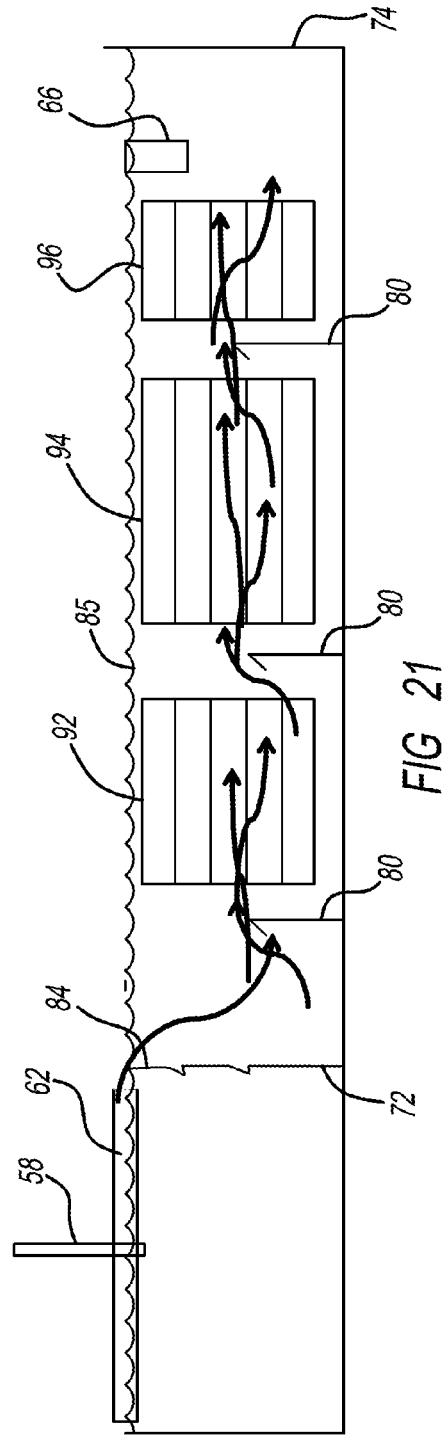

REMOTE SUBMERGED CHAIN CONVEYOR

CROSS-REFERENCE TO RELATED APPLICATIONS

This application is the National Stage of International Application PCT/US2014/025892, filed on Mar. 14, 2014, which claims priority to U.S. provisional application Ser. No. 61/792,088 filed on Mar. 15, 2013, and U.S. provisional application Ser. No. 61/891,109 filed on Oct. 15, 2013. All of these applications are herewith incorporated by reference in their entirety.

FIELD OF THE INVENTION

This invention relates to a system for handling ash, and particularly to a remote submerged chain conveyor (RSCC) system for dewatering coal-ash/water slurries from large-scale coal combustion devices.

BACKGROUND OF THE INVENTION

The following description of general background of the present invention makes reference to drawing figures including FIGS. 1 through 4. The combustion process of coal in power utility fired boilers produces two types of waste products: 1) ash particles that are small enough to be entrained in the flue gas referred to as fly ash, and 2) relatively large ash particles that overcome drag in the combustion gases and drop to the bottom of the boiler referred to as bottom ash. Typically, bottom ash is either collected in a water impoundment or in a dry bottom. Water impounded ash, referred to as wet bottom ash, is typically collected in individual water filled hoppers, as shown in FIG. 1 which illustrates a typical bottom ash to pond system 10, or in a closed loop recirculation system 26 shown in FIG. 2, or in a water filled trough with a submerged drag chain system 12 as shown in FIG. 3. In the system of FIG. 1, ash is discharged each shift in a batch process from hoppers 14 through a bottom gate 16 on the side of the hoppers 14. Grinders 18 are provided to reduce ash particle size to less than 2 in. (typically) to allow conveyance in a pipe as an ash/water slurry. The slurry is discharged into a storage pond 20 where the ash settles out over time. Numerous pumps 22 and valves 24 are provided for moving the slurry through system 10. A modified form of system 10 provides closed loop dewatering system referred to as "Hydrobin® Dewatering System" 26 as shown in FIG. 2.

In the system 26 shown in FIG. 2, bottom ash 11 is discharged from the hopper 14 into the grinder 18 and is then pumped to remotely located dewatering bins 28. There is provided a two-stage settling process which is necessary to clarify the water enough for recycling. Settled ash is drained of water through screens in the dewatering bins 28. Surge tank 30 and settling tank 32 handle the drained water and provide further clarification and separation of coal ash from the water. Clarified water is recycled back to convey the next batch of ash slurry. Dewatered ash slurry is hauled away from the plant site.

The submerged mechanical drag conveyor system 12 illustrated in FIG. 3 is typically applied to provide continuous ash removal. Ash from the submerged drag chain conveyor unit 34 is dewatered through an inclined section 36 and transported via a conveyor 44 and into a bottom ash silo 38 and is discharged into a truck to transport the material off-site. Mill reject hoppers 40 are provided to process such material which is directed onto chain conveyor inclined section 36 for processing along with the bottom ash slurry stream. The submerged drag chain conveyor unit 34 is positioned directly beneath the boiler ash hopper discharge 42. Another view of submerged drag chain conveyor unit 12 is shown in FIG. 4 which further illustrates the conveyor drive unit 46 and take up unit 48 which provides proper conveyor chain tensioning. In this prior art system, one of the units 12 shown in FIGS. 3 and 4 is provided for each boiler ash hopper discharge 42. In the unit of FIG. 4 the dewatered ash is directly discharge into a truck for off-site transfer.

SUMMARY OF THE INVENTION

This invention provides an alternative for dewatering ash slurry in which the slurry discharged from a number of individual bottom hoppers is transported to a remotely located remote submerged chain conveyor (RSCC) system. This system can be placed at a convenient location displaced from the boiler and provides many of the same functions as the basic submerged mechanical drag conveyor system 12 shown in FIGS. 3 and 4. This invention will be referred to as the remote submerged chain conveyor system or RSCC 50.

For the RSCC 50 described in accordance with the present invention, a section of the conveyor system acts as a settlement tank much in the manner of the settling tank 32 in a Hydrobin® system 26 described above except that the settling tank is elongated. Accordingly, the RSCC system 50 can be considered in many respects as a hybrid of features of submerged chain conveyor system 12 and Hydrobin system 26.

BRIEF DESCRIPTION OF THE DRAWINGS

FIGS. 12A and 12B illustrate simplified cross-sectional views through an ash holding section and an ash settling section in accordance with a first embodiment of the present invention.

FIG. 14 illustrates dimensional relationships for an ash settling section in accordance with a first embodiment of the present invention.

FIGS. 15A and 15B illustrate features of a containment plate.

FIG. 19 is a cross-sectional view through an ash holding section and ash settling section in accordance with a second embodiment of the present invention employing a single array of stacked plates.

FIG. 21 is a cross-sectional view through an ash holding section and an ash settling section in accordance with a third embodiment of the present invention integrating features of baffles and groups of stacked plates.

DETAILED DESCRIPTION OF THE INVENTION

The RSCC system 50 in accordance with this invention is a dewatering device located remotely from the boiler (or multiple boilers) which utilizes a submerged drag chain conveyor for removal and dewatering of settled material. The system is a combination of a dewatering bin and a settling tank and is capable of dewatering the ash solids to an acceptable moisture level and at the same time able to clarify the re-circulated water to a desired concentration (mg/L or PPM). In accordance with this invention, bottom ash 11 is discharged from the boiler ash hopper 14 each shift into grinder 18 and is then pumped to remotely located RSCC 50. All the clarification of the slurry (dewatering) is done in a single stage and the water is recycled.

Figure 1:
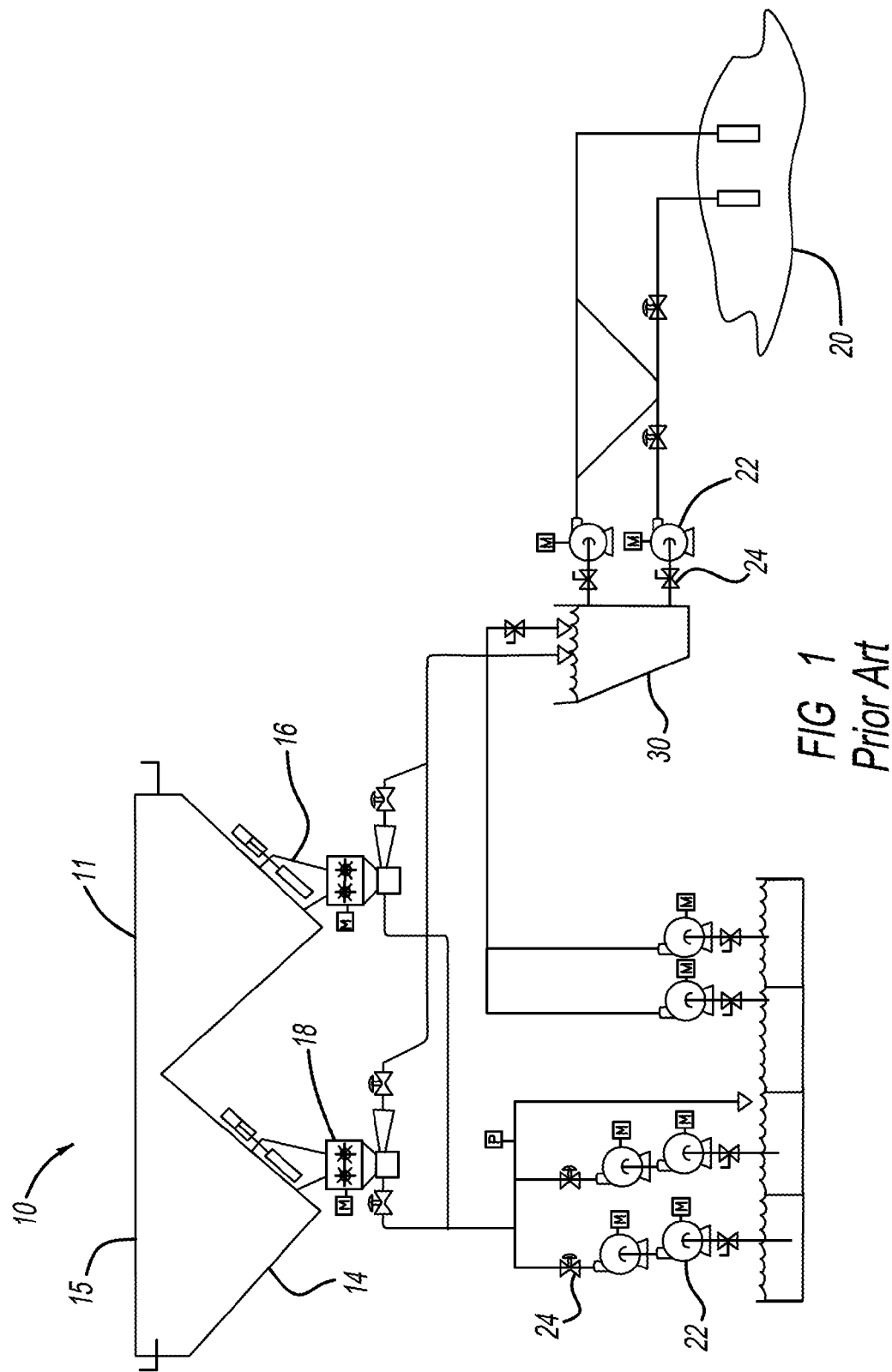
FIG. 1 illustrates a typical bottom ash to pond ash handling system in accordance with the prior art.
Figure 2:
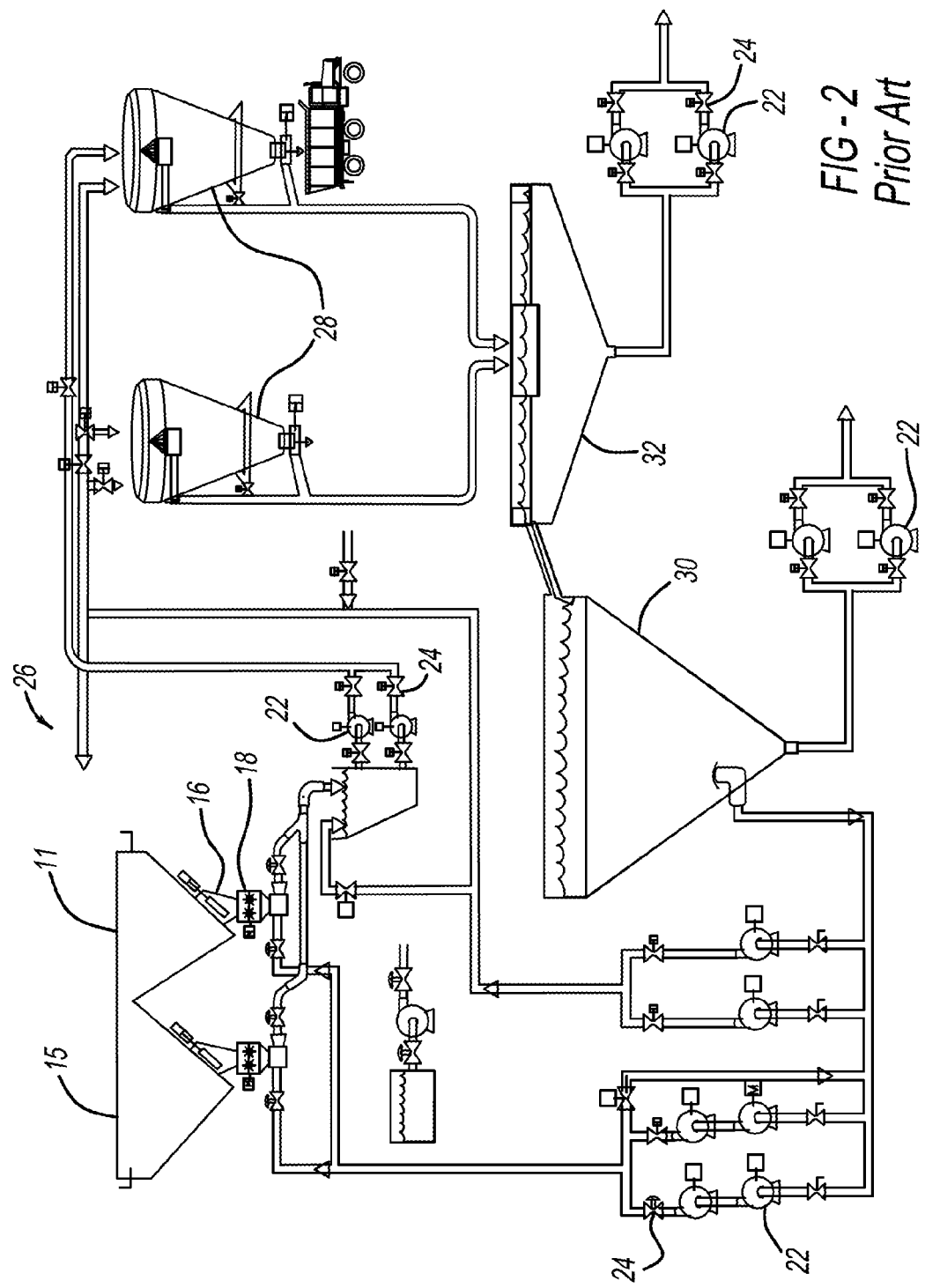
FIG. 2 illustrates a typical closed loop recirculation system for ash slurry handling in accordance with the prior art.
Figure 3:
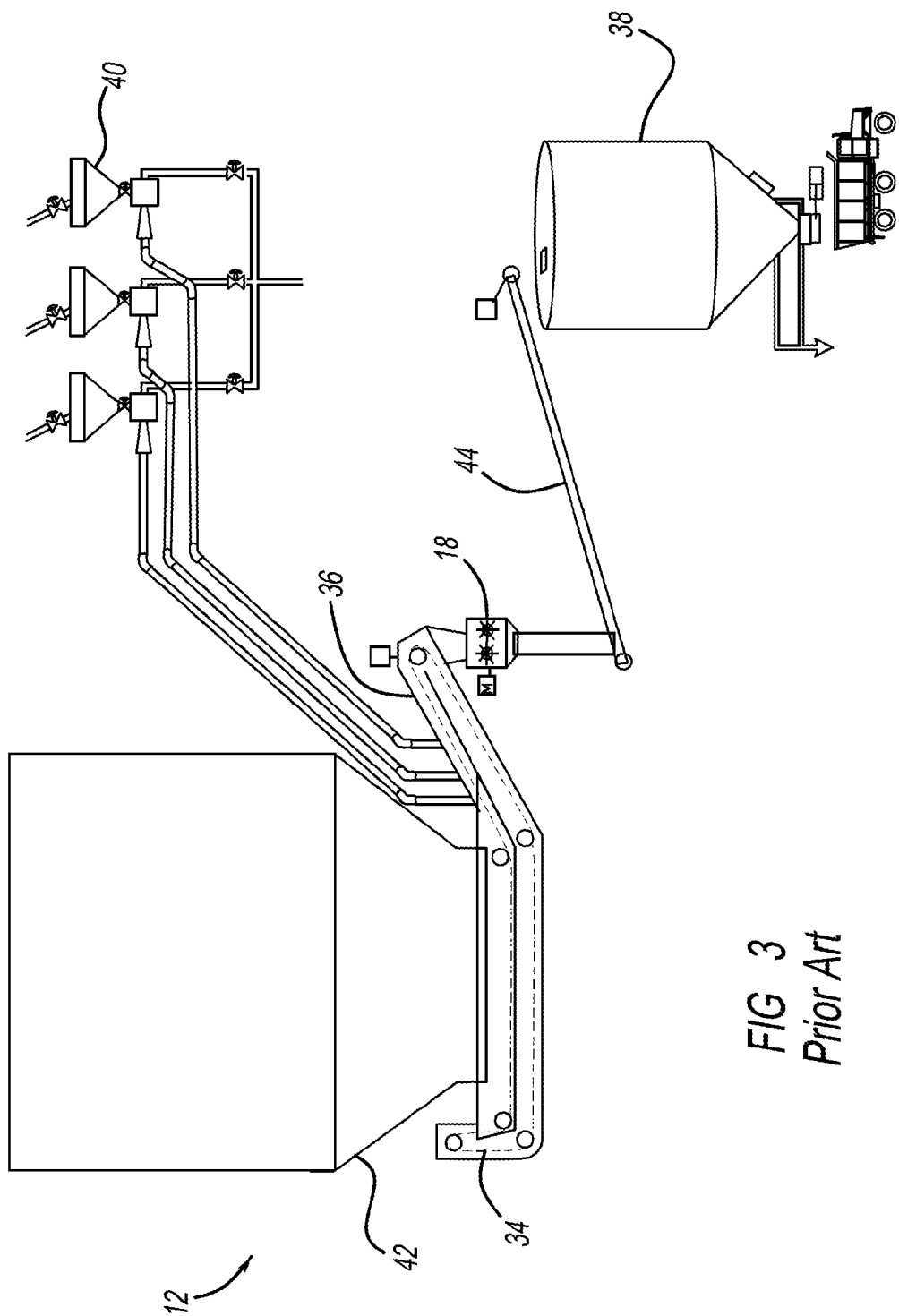
FIGS. 3 and 4 illustrate a typical bottom ash submerged drag chain conveyor system in accordance with the prior art.
Figure 4:
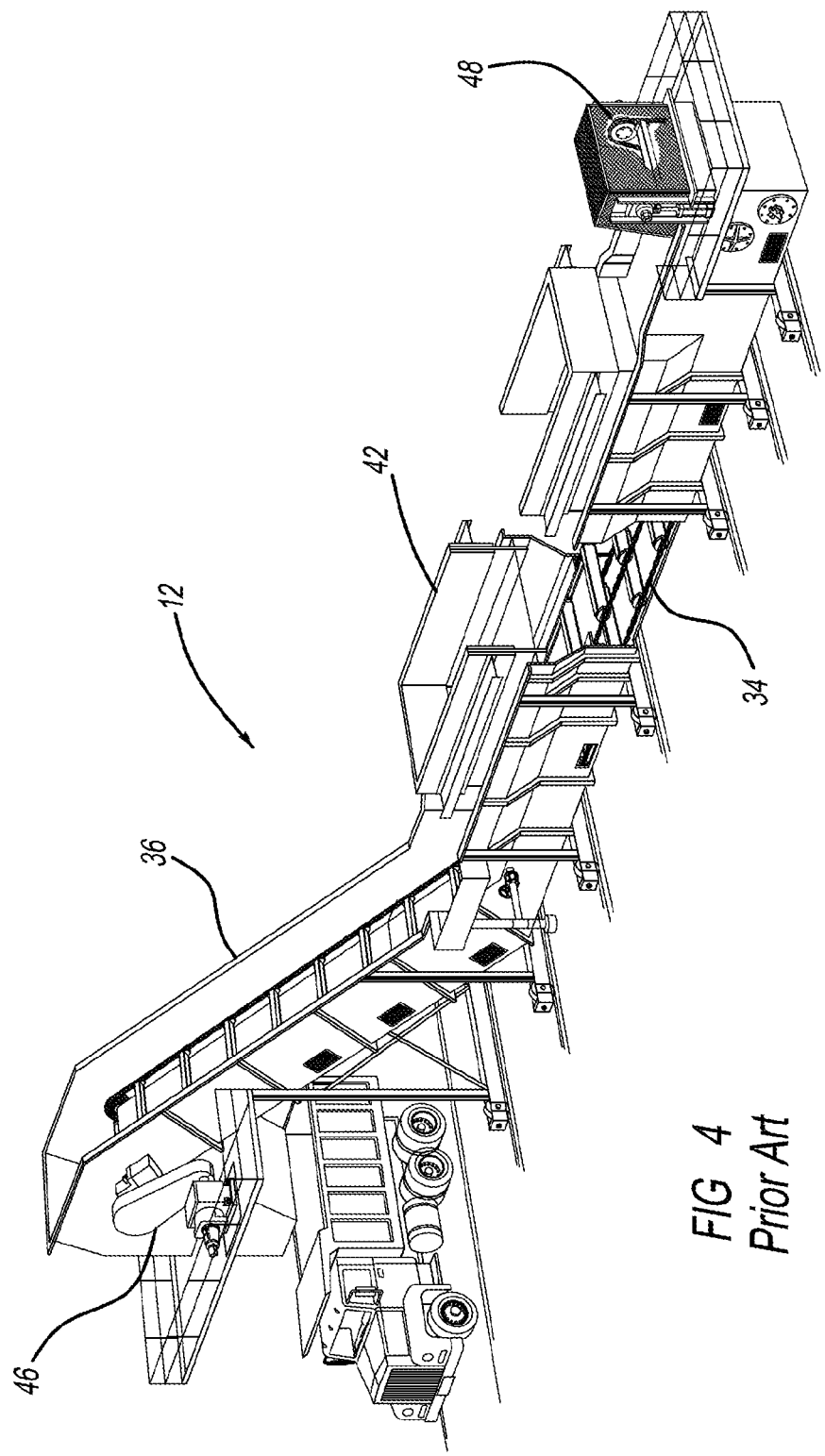
Figure 5:
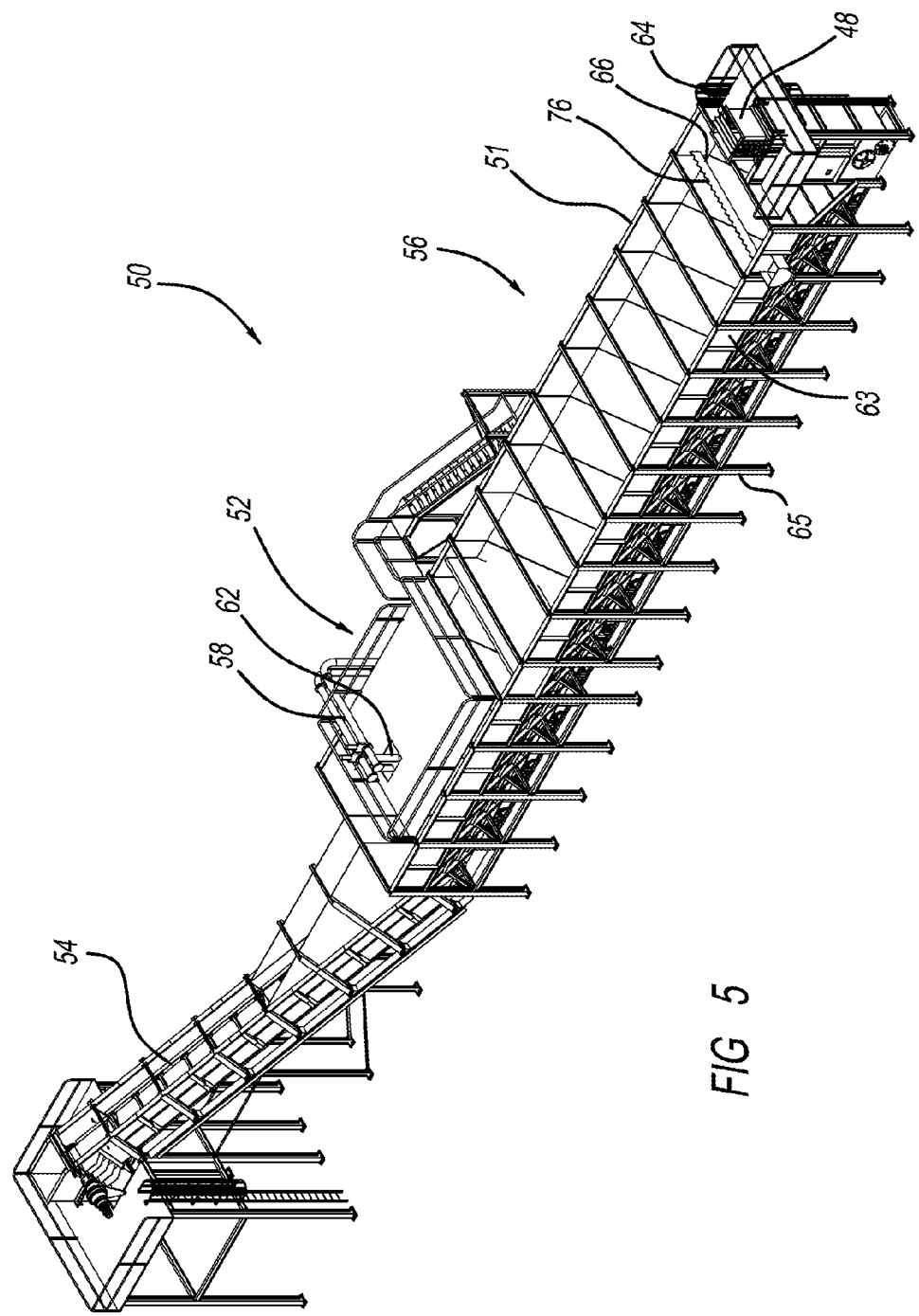
FIG. 5 illustrates a remote submerged chain conveyor (RSCC) system in accordance with the present invention.
Figure 6:
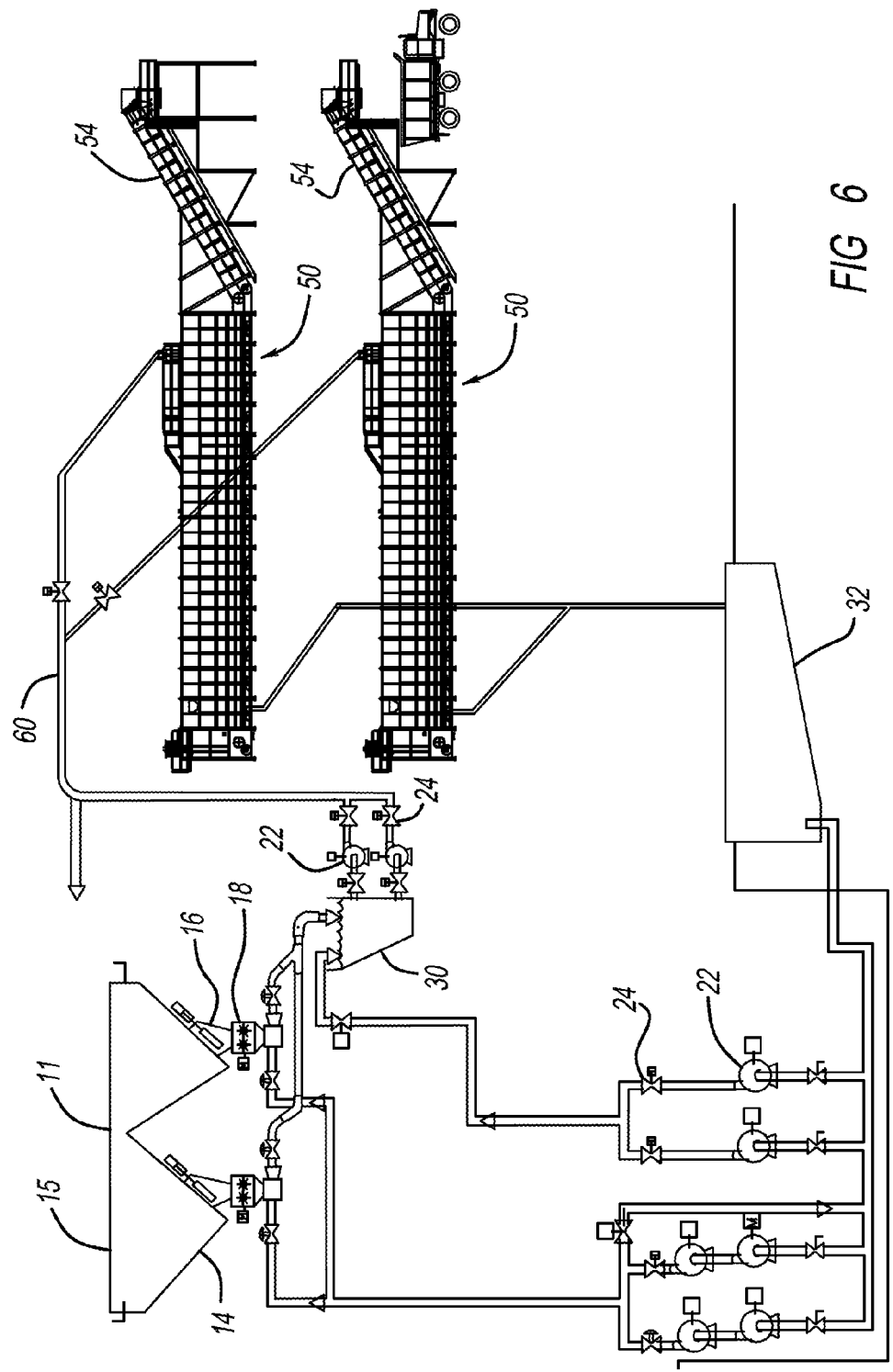
FIG. 6 illustrates schematically use of multiple RSCC systems in accordance with this invention.

An RSCC system 50 is shown in FIGS. 5 through 6, and consists of a large elongated containment tank 51 having three main sections including ash holding section (or storage section) 52, dewatering section 54, and ash settling section (or settling area) 56. These sections are described in further detail as follows.

The RSCC ash holding section 52 is the entry zone for the incoming coal ash/water slurry and it is located near the solid discharge end of the slurry discharge pipes 58. The solid inflow rate from pipes 58 may be two to three times larger than the solid removal rate from RSCC 50. Therefore, the ash holding section 52 is ideally sized to hold an entire boiler load. Ash holding section 52 contains the bulk of the accumulated volume of ash that is large enough to settle quickly (which may be greater than 90% of the total solids mass). The incoming slurry discharges onto a deflector plate 62 for dispersion rather than directly into the water in the ash holding section 52 in order to deaden jet impingement on the conveyor equipment.

In one embodiment of the present invention, the ash holding section 52 is sized to accommodate the influx of material from different boiler units 15. As shown in FIG. 6, a pair of RSCC units 50 could be provided for a single boiler unit 15, or number of boiler units 15 could be serviced by a smaller, equal, or greater number of RSCC units 50. The flow of ash slurry can be conveyed through associated plumbing systems with valves 24 and pumps 22 for managing the ash load based upon the ash settling capacity provided by the RSCC units 50. For coal bottom ash process, the ash holding section 52 is used for solid storage during the emptying of boiler bottom hoppers 14. Transport pipes 60 from different boilers 15 can discharge independently into the ash holding section 52 to eliminate the need for additional hardware such as valves and actuators. The capacity of the ash holding section 52 is dictated by the volume needed to meet the solid conveyance rate or customer storage requirements.

The dewatering section 54 shown in FIG. 5 is the inclined portion of the drag chain 64 where the ash solids are dewatered prior to unloading. The speed of the submerged drag chain 64 and the length of inclined section 54 determines the dewatering time which is very dependent on the ash characteristics. The majority of the moisture will be lost in the first few minutes after the ash is extracted from the water. The remaining small fraction is lost in several hours. Therefore, there is an optimum length for the dewatering section 54 where beyond which there is a diminishing return in terms of the dewatering the ash. The dewatering section 54 length is dictated by the solid porosity and their ability to hold water. In general, solids lose a majority of their moisture in two to three minutes after removal from the water bath. Dewatering length and chain speed are designed to provide the necessary dewatering time. A dewatering section 54 inclination angle ranging between 25° and 35° from horizontal is considered optimum for certain embodiments of the present invention.

The settling section 56 is a principal feature of the RSCC system 50 in accordance with this invention. In this section, the effluent is clarified to a desired low concentration of solids. Solid separation is primarily accomplished by gravity settling. The key metric for determining this zone's dimension is the particle settling velocity which is a function of particle size, particle density, and water temperature. A further discussion of the theory of design of ash settling section 56 along with several embodiments of that section are provided following a general discussion of additional mechanical features of RSCC 50.

Beside the hydraulic aspect of the RSCC 50 which will be described in the following sections in detail, numerous mechanical components of the above referenced sections play an import role in the design of the RSCC system. The mechanical components include; drag chain 64, drive unit 46, and chain take up mechanism 48. A variable speed drive adjusted manually or/and remotely via DCS for driving drag chain 64 is preferably provided having forward and reverse chain motion capability, along with a system for monitoring drive unit torque to protect the chain.

Drag chain 64 is a standard product with matching sprockets and has two side chains with paddle shaped flights extending between them for moving accumulated particulates. Drive unit 46 may be a commercial hydraulic system. Chain stretching is compensated for by the take up mechanism 48 which may include a hydraulic cylinder. The chain loading is continuously monitored to protect the drag chain 64 in the event of an overload. Preferably take up mechanism 48 is capable of independent adjustment of both sides of the drag chain 64.

A general background discussion of basic concepts of gravity density separation of solid/liquid mixtures is useful to explain operation of ash settling section 56. The ash settling section 56 surface area ($A_s$), i.e. width (W) times length (L), is selected such that the particle settling velocity ($V_s$) is greater than the ratio of the volumetric flow (Q) and the surface area (i.e. $V_s > Q/As$). This condition is graphically illustrated in FIGS. 7 and 8, and is based on idealized rectangular tank settling theory. In this condition, a particle starting at the settling section inlet (proximal end 72) and beginning at the liquid surface would be retained long enough to reach the tank bottom at the distal end (i.e. where the liquid is discharged). The metric for sizing the settling zone is based on discrete particle settling approach, meaning that motion of an individual solids particle is considered and assumes no particle-to-particle interaction. Knowing the particle size distribution, particle density, flow area, and surface area, one can predict the outlet concentration as a function of tank surface area. The relationship between outlet concentration and tank surface area for discrete particle settling can be developed for a given ash sample. Generally, the larger the tank surface area ($A_s$), the lower the discharged effluent particle concentration in parts per million (PPM). However, there is a diminishing return where a larger tank area provides marginal reduction in PPM.

Figure 7:
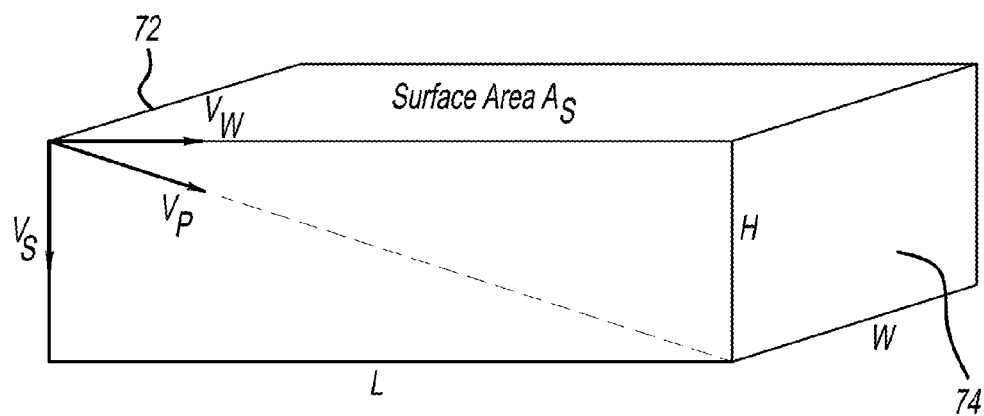
FIG. 7 is a diagram in connection with a description of rectangular tank settling theory.

With continued reference to FIG. 7 where tank dimensions L, W, H are designated along with particle settlement velocity vectors $V_s$, $V_w$, and $V_p$, the following relationships are developed for particle settlement modeling, based on idealized conditions, which assumes that the flow of the water is horizontal and uniform. A particle is predicted to settle and the removed when the settling time is less than or equal to the water detention time:

Settling Time=$H/V_s$

Water Detention Time=$H*W*L/Q$ $H/V_s \leq H*W*L/Q$ and

Simplifying: $Q/A_s \leq V_s$

Figure 8:
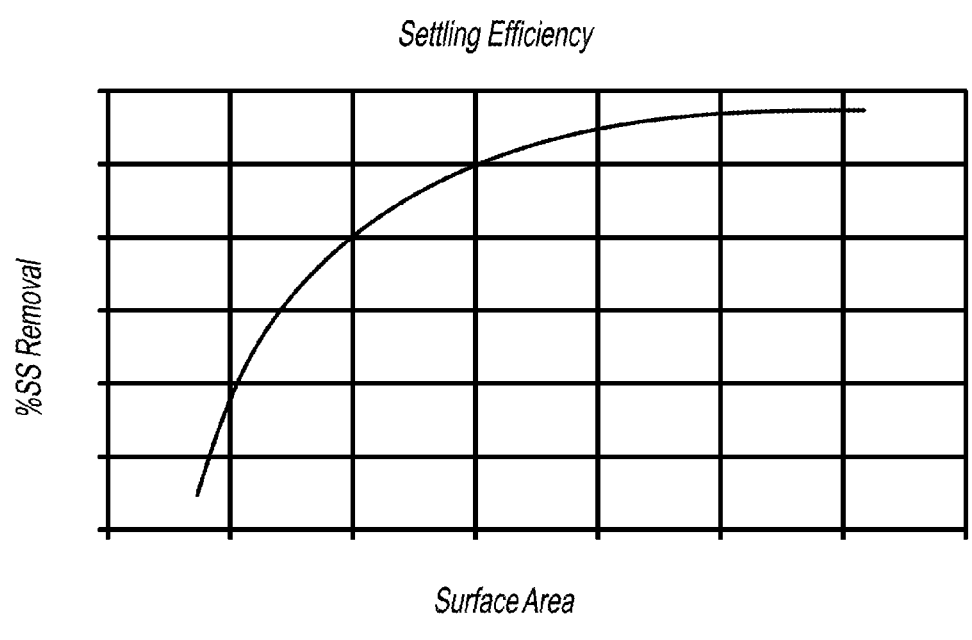
FIG. 8 is a graph of idealized settling efficiency as a function of surface area and solids removal.

Again based on idealized conditions, FIG. 8 illustrates settling efficiency as related to percent solids removal and surface area of the settlement zone. The relationship characterized previously indicates that settling efficiency increases with surface area $A_s$ of the settlement zone.

In practice, particles in the settling zone (ash settling section 56) are not discrete and do integrate and interact with each other. This interaction allows small particles to coagulate and settle quicker. This phenomenon is referred to as natural coagulation and is influenced by particle concentration and other characteristics. This approach yields a smaller tank size capable of meeting PPM requirements compared to the discrete particle approach discussed previously.

The depth (or height designated as H) of the ash settling section 56 is less critical than the surface area, yet there is an optimum for; 1) providing adequate retention time for natural coagulation, 2) providing stable water flow, and 3) avoiding scour of material settled on the drag chain 64. The length of ash settling section 56 is mainly governed by the particle settling velocity, slurry flow, and tank width. The settling velocity $V_s$ is dependent on particle size, particle density, and fluid temperature. Such parameters are typically defined by the application. The tank width (W) is selected for ease of manufacturability and transportation of prefab pieces.

Figure 9A:
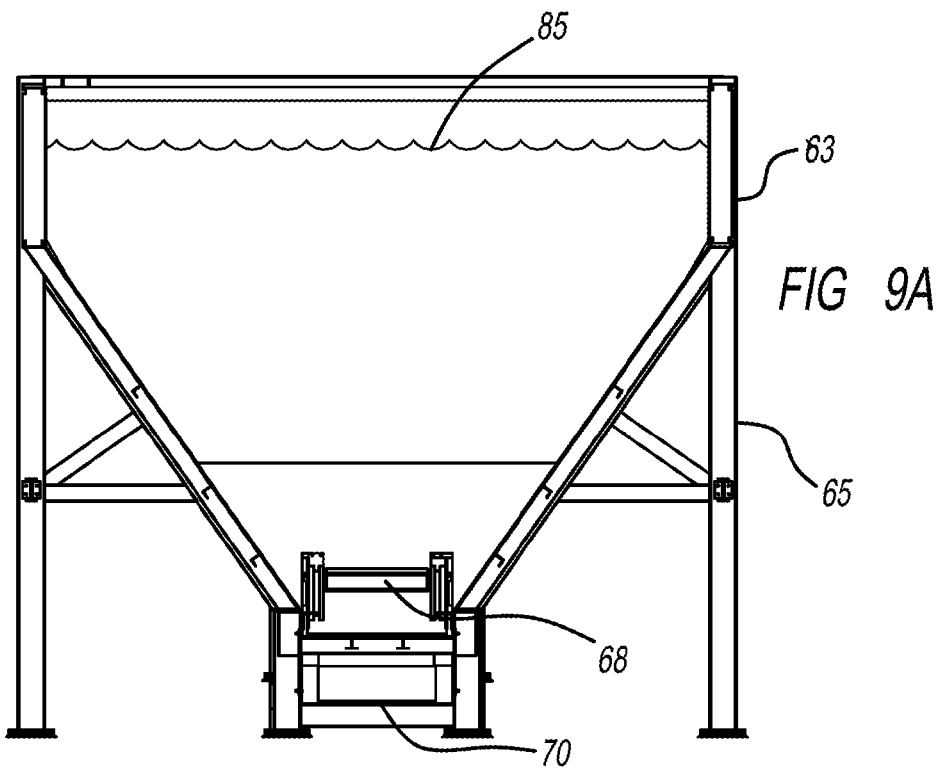
FIGS. 9A and 9B are cross-sections through an ash settling section accordance with the present invention.
Figure 9B:
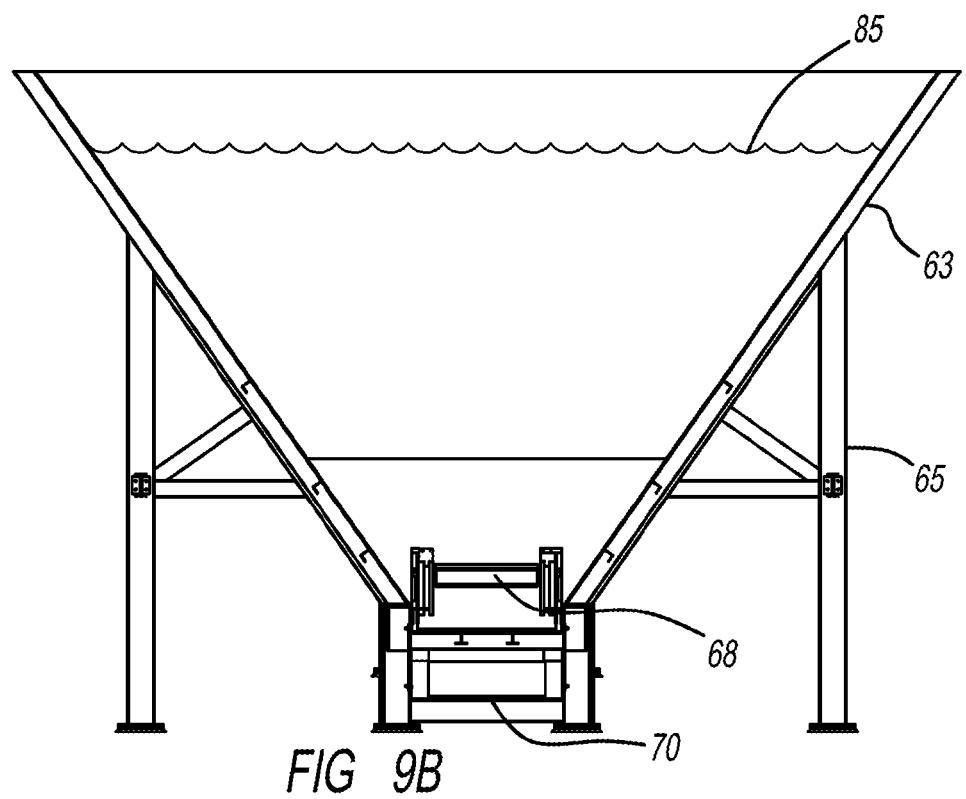

FIGS. 9A and 9B illustrate cross-sections through embodiments of ash settling section 56, showing that the configuration of side walls 63. FIG. 9A represents a settling section 56 having sidewalls forming a generally hexagon shaped water cross-section, whereas FIG. 9 illustrates an embodiment in which the settling section sidewalls form a generally quadrilateral shaped water cross-section. Shown at the bottom section of each of the embodiments is endless drag chain 64 having an upper path 68 for moving solids and a lower return path 70. Legs 65 provide structural support for RSCC ash holding and settling sections 52 and 56.

Figure 10:
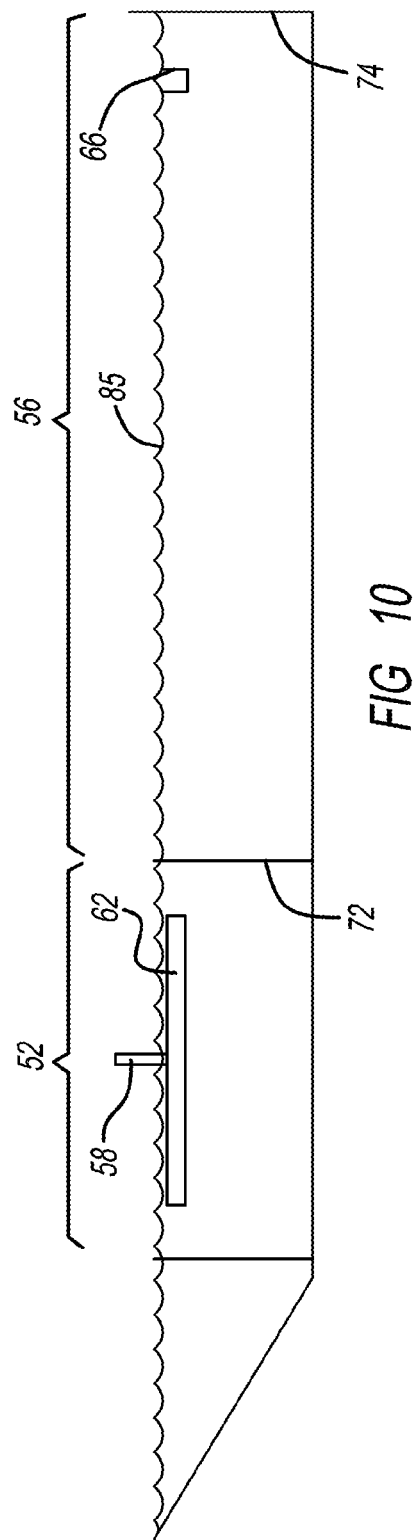
FIG. 10 illustrates basic components of the ash holding and ash settling sections of an RSCC in accordance with this invention FIG. 11 graphically illustrates tank flow patterns in an ash settling section without features to provide more uniform flow velocities across the water flow cross-section of the ash settling section.

Referring to FIG. 10, a generalized longitudinal cross-section of ash holding section 52 and ash settling section 56 is provided. Water and slurry flow from ash settling section proximal end 72 to distal end 74. The drain trough 66 can be either a single section extending across the tank width but preferably situated at least 2-3 feet away from distal end 74, or it can extend in the axial direction. The drain trough 74 is equipped with a serrated weir 76 along its upper perimeter to limit particle carry over into the drain. The drain trough 66 should be located near the rear of the tank to maximize settling time. However, it is not best to place the trough 74 at the extreme back wall of the distal end 74 because the density currents (described in more detail as follows) tend to ride up the back wall. There is an optimum placement, balancing settling time with back wall effects.

In ash settling section 56 in accordance with this invention the general flow of water and ash particles is in the right-hand direction as the section is shown in FIG. 10, i.e. from proximal end 72 toward distal end 74, whereas the upper path 68 of drag chain 64 moves in an opposite direction i.e. from right-to-left in the figure. Thus the portion of drag chain 64 which moves the solids, causes the solids to move against the general flow of water through the system.

One single drain trough 66 may be placed across the width of the tank, or several sections may be used to meet the design criteria. The sections can be placed in parallel or perpendicular to the axial flow. Additional inventive features of ash settling section 56 are described later in this specification following a discussion of additional particle settling theory.

Figure 11:
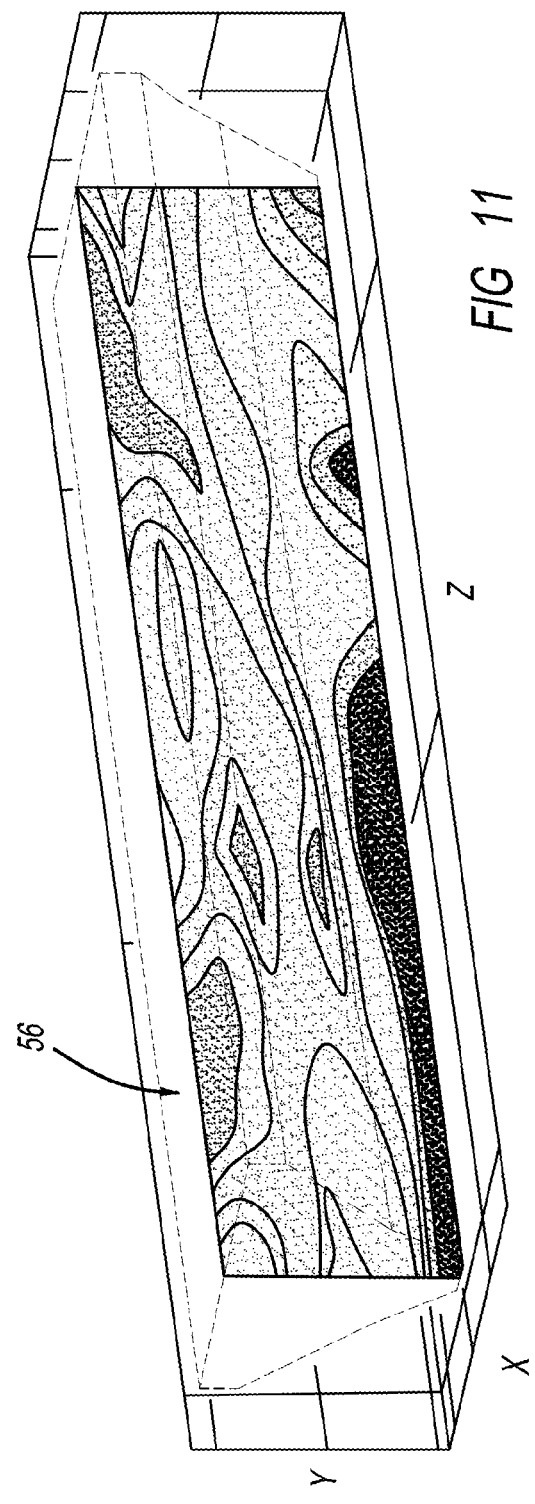

FIG. 11 illustrates tank flow patterns in the ash settling section 56 without internal features in accordance with this invention, and serves to aid in an understanding of the features of the present invention. In FIG. 11, darker regions designate areas of higher velocity. As shown, an elongated configuration ash settling section 56 without baffles or other features described later will have a strong current along the bottom of the tank (density current) resulting in a "short-circuiting" of the flow (i.e. a strong high velocity flow along the bottom). Density currents are the result of a concentrated stream of particles plunging to the bottom of the tank due to its high specific gravity. This occurs in the settling section 56 of the tank so it is largely made up of the smaller size fraction of the particle size range. Strong current continues along the bottom unimpeded toward the rear of the tank. When it approaches the end wall of distal end 74 at the discharge around it will turn upward, delivering a highly concentrated stream into the drain trough 66 which is, of course, undesirable. This high flow velocity is designated in FIG. 11 at the bottom of the tank and interferes with the desired particle separation activity.

Figure 13A:
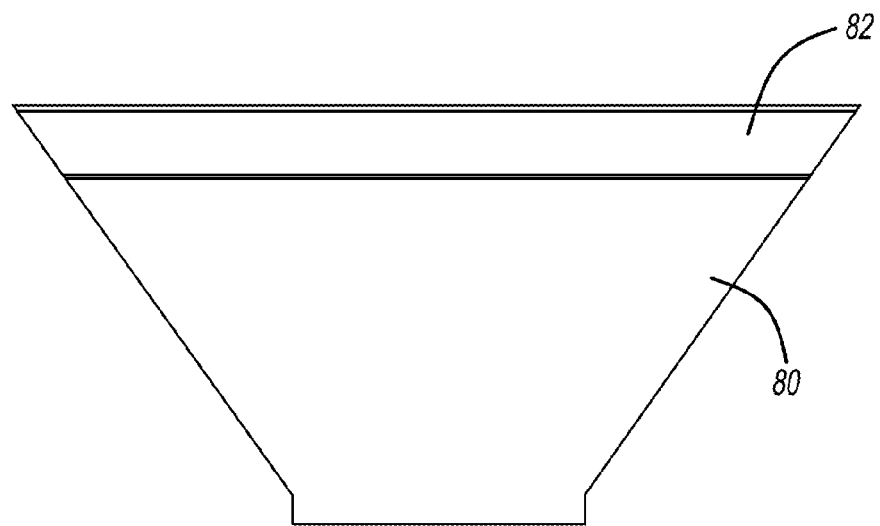
FIGS. 13A, 13B and 13C illustrate and embodiment of baffles used in the embodiment shown in FIGS. 12A and 12B.
Figure 13B:
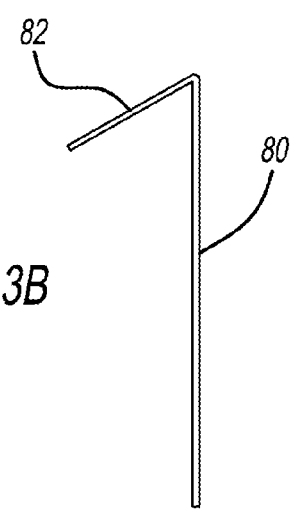
Figure 13C:
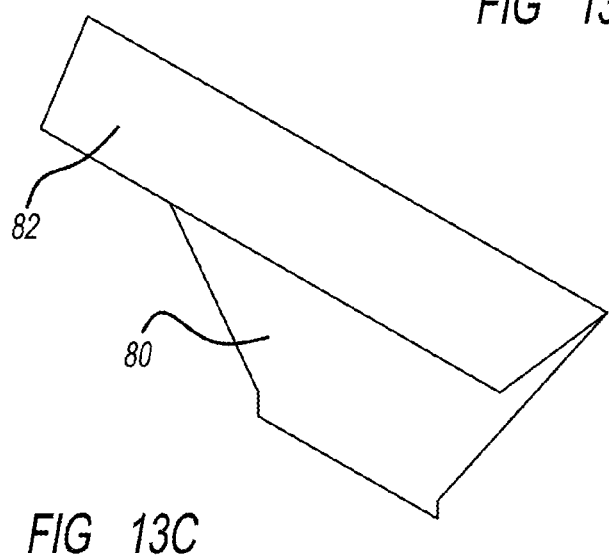

FIGS. 12A and 12B illustrate cross-sections of the ash holding section 52 and ash settling section 56 in accordance with a first embodiment of this invention. In accordance with this embodiment, baffles or shields 80 are provided in ash settling section 56 as indicated in the Figures. Baffles 80 (of a non-perforated variety) preferably extend less than one-half the height of the water column between drag chain 64 and liquid level 85 and extend across the entire width of the water flow path along ash settling section 56. Redistribution of flow to be uniform is ordinarily difficult with the density currents mentioned previously. In FIG. 12A, the predominant flow of material through the ash settling section 56 is represented by lines with direction arrows. The provision of the baffles 80 progressively weakens the density current as it travels toward overflow drain trough 66. Several short baffles 80 are placed along the bottom, forcing the current to travel in a roller coaster pattern as indicated by the arrows in FIG. 12A. Each time the current drops between baffles 80 it leaves a portion of solids behind (which can be removed by the drag chain 64). The progressively weakening current has a lesser tendency to dive down between the baffles 80 each pass. Preferably baffles 80 feature a bent over flap 82 shown in FIGS. 13A, 13B and 13C directed against the flow of material through ash settling section 56, further disrupting the transfer of solids between sections bounded by the baffles. It is noted that the conveyor drag chain 64 will move just below the bottom edge of the baffles 80 to remove the settled-out particles.

Through experimentation, relationships between the heights of the baffles 80 which may include baffles of a relatively short height ($D_1$) along with one or more baffles of a relatively taller height ($D_2$) can be developed as related to their separations, designated by dimensions $L_1$, $L_2$, $L_3$ and $L_4$, considered with the length (L) of the ash settling section 56. With these dimensional definitions in mind which are designated in FIG. 14, the following design relationships are believed to provide enhanced settling efficiency:

$$0.15L < L_1 < 0.25L$$

$$0.25L < L_2 < 0.35L$$

$$0.15L < L_3 < 0.25L$$

$$0.1L < L_4 < 0.15L$$

$$D > 10 \text{ ft}$$

$$0.3D < D_1 < 0.4D$$

$$0.4D < D_2 < 0.5D$$

At the junction between ash holding section 52 and ash settling section 56 containment plate 84 is provided. Containment plate 84 provides a hydraulic decoupling between the turbulent inlet section and the ash settling section 56. FIGS. 15A and 15B show a containment plate 84 used to prevent the bulk accumulated volume of large particles in the ash holding section 52 from spilling into the ash settling section 56 and disrupting the flow patterns. Containment plate 84 includes a number of deflected flaps 86 acting as a coarse filter for the flow.

Figure 16:
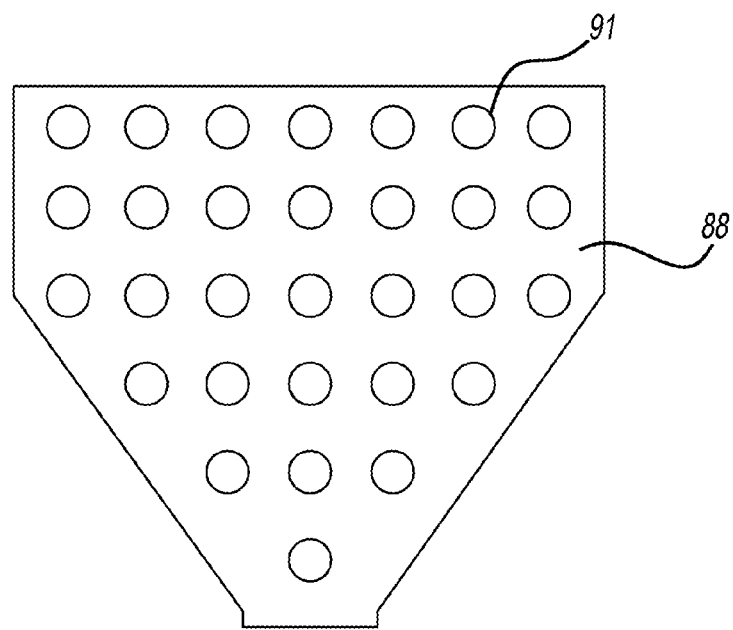
FIG. 16 illustrates an alternate embodiment of a baffle component.

FIG. 16 illustrates an alternate embodiment of a baffle 88 which may be used in ash settling section 56 as an alternative to the design of baffle 80 discussed previously. Baffle 88 features numerous apertures 91 shown as round holes in the figure. Baffle 88 is intended to extend upwardly the full height of the water column within ash settling section 56 (or substantially full height of the water column). Baffle 88 is intended to provide more uniform flow velocity of the ash slurry and water as it moves from proximal and 72 toward distal and 74. Baffle 88 breaks up the density currents previously discussed. Baffle 88 may be positioned at the locations previously described for baffle 80. Other configurations of a baffle may be used, for example having different shaped apertures or other features to disrupt concentrated high velocity flow, particularly along the lower region of the water column as the slurry moves toward distal and 74. For example, a baffle having a configuration similar to containment plate 84 may be employed.

Figure 17:
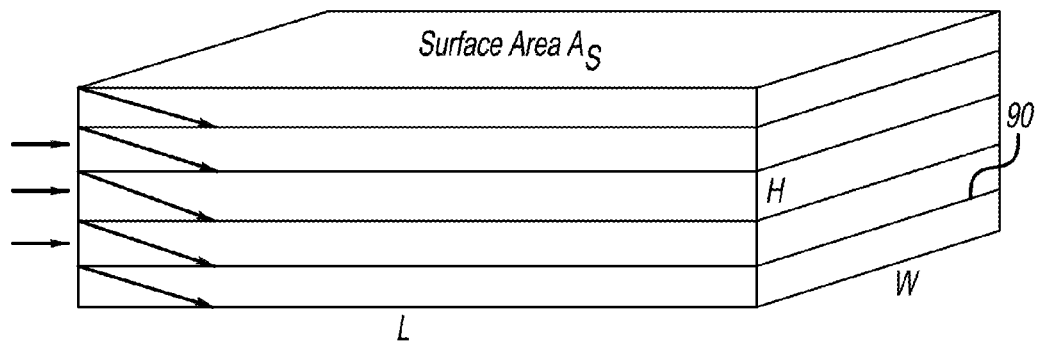
FIG. 17 illustrates conceptually use of stacked plates for particle settling.
Figure 18A:
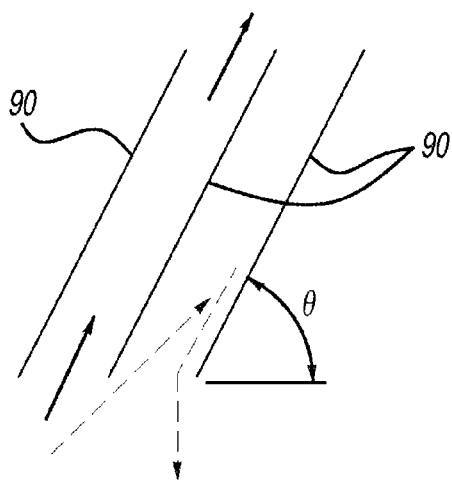
FIGS. 18A, 18B and 18C illustrate flow conditions when using stacked plates for particle settling.
Figure 18B:
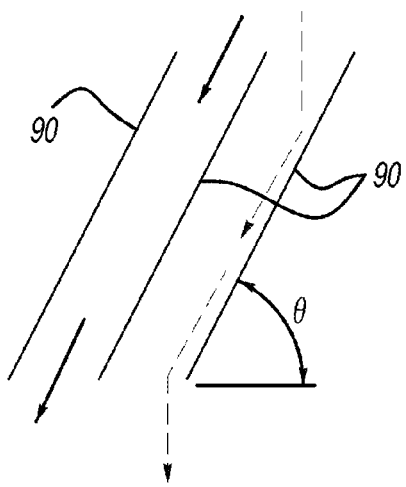
Figure 18C:
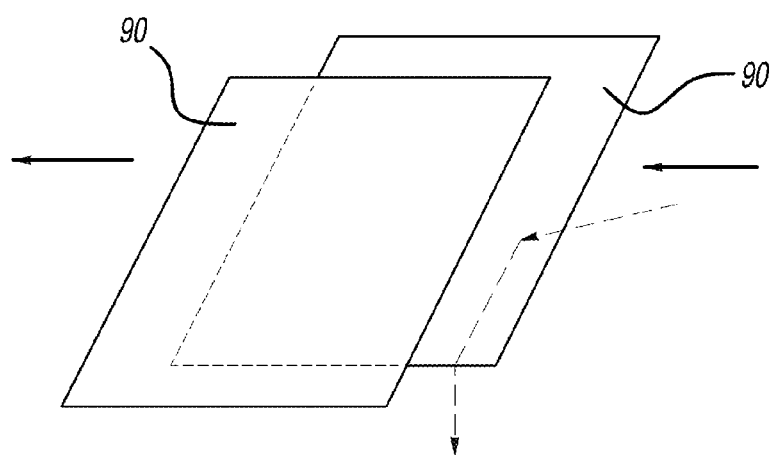

FIG. 17 illustrates conceptually an approach toward enhancing settling efficiency through the use of stacked plates 90 located in the ash settling zone 56. The use of stacked plates 90 can be combined with features of baffles 80 described previously to enhance separation efficiency. Stacked plates 90 provide a significant increase in the effective surface area provided in the settling zone. Multiple plates 90 can be stacked to increase this effect. These plates 90 increases the effective surface area available for settling but without requiring an increase in tank size. Various orientations of the plates can be provided as illustrated by FIGS. 18A, 18B and 18C. In these figures, liquid flow is shown by solid lines and the flow of solids is shown in broken lines. In one implementation referred to as a countercurrent flow arrangement shown in FIG. 18A, the plates may be positioned at an angle θ (skewed from horizontal) so that solids settling on the plates can shed off by gravity. In this configuration, liquid enters from a lower portion of the gap between adjacent plates and moves in a horizontal an upward direction along the plate surfaces. FIG. 18B illustrates a co-current flow condition in which the predominant liquid flow is horizontal and downward. FIG. 18C shows a cross-flow condition in which the predominant liquid flow is generally along the plates. At plate angles of less than about 60° from horizontal, there is theoretically little difference in these configurations. For applications with ash settling section 56, the cross-flow configuration illustrated in FIG. 18C is believed particularly applicable since this configuration does not divert the horizontal flow stream, which aids in reducing eddies and turbulent flow conditions thereby aiding in solid settling efficiency. By angling the plates as shown in the figures, collected solids can fall by gravity along the surfaces of the plates 90 where they can be collected and transported.

FIG. 19 illustrates a cross-section of ash holding section 52 and ash settling section 56 with the stacked plates 90 system. In this embodiment of the invention, stacked plates 90 are provided in a cross-flow configuration. It is noted that the conveyor chain will move just below the bottom edge of the baffles 80 as they are installed in the ash settling section. As shown by the flow arrows the higher velocity density current will tend to flow along the lower plates 90. FIG. 17 shows vector arrows illustrating the relative velocity of the ash/water mixture moving along the zones created by the stacked plates. Without further measures as described below, a higher flow velocity (density current) will occur in the lower channels defined by the stacked plates. More preferred is to provide generally equal velocity between all the zones defined by the stacked plates.

Figure 20:
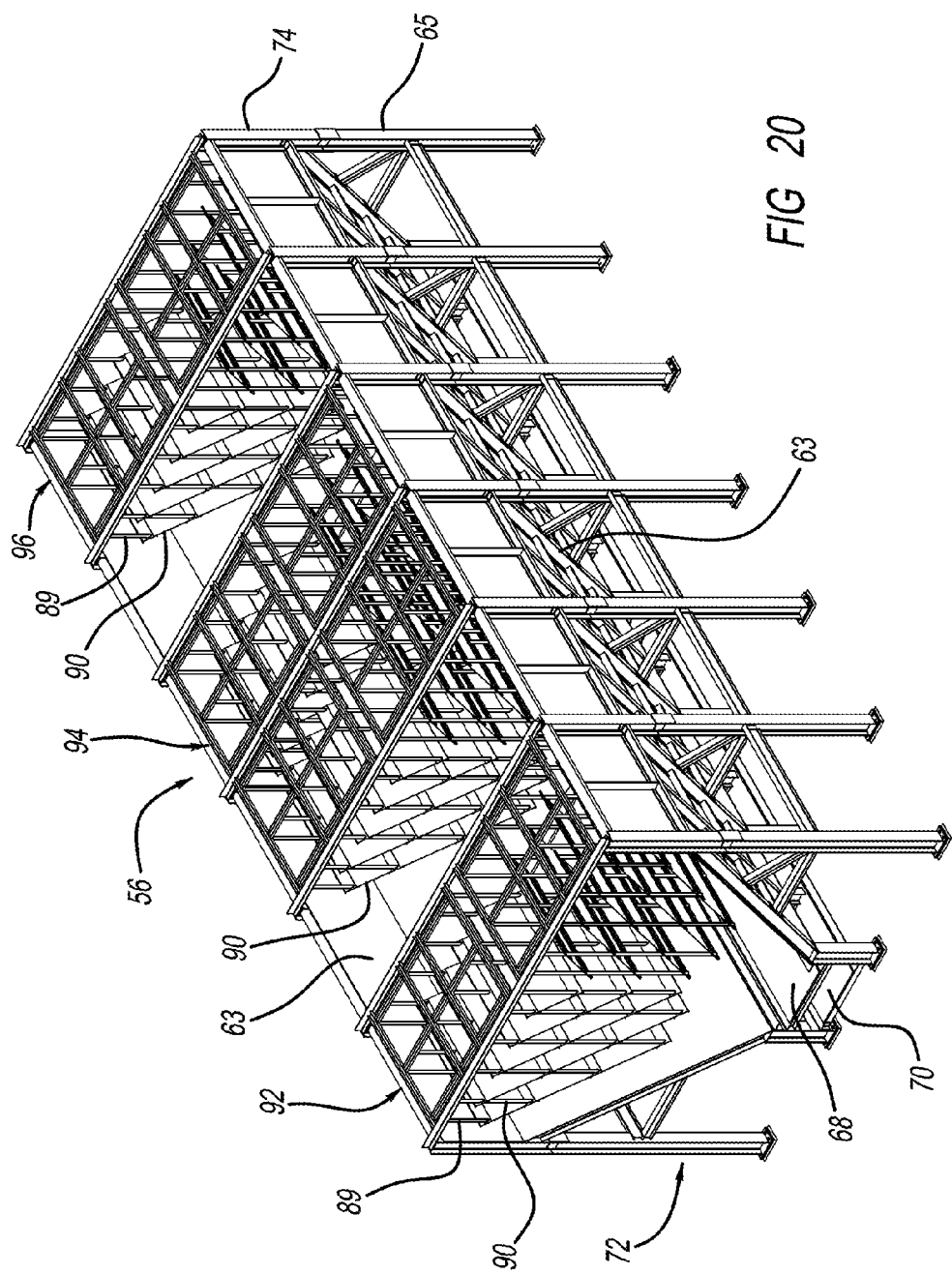
FIG. 20 is a pictorial view of the ash settling section shown in FIG. 19 with multiple arrays of stacked plates.

FIG. 20 illustrates an implementation of stacked plates 90. The plates 90 may be stacked in a pair of arrays which are symmetric about a vertical plane passing through the longitudinal center of the ash settling section 56. The pairs of arrays of stacked plates 90 are angled to the bottom of the V-shaped ash settling section walls 63, and preferably are oriented parallel to the surface of the side walls. As mentioned previously, the effective area created by plates 90 is equal to their projected horizontal surface area, whereas their inclined orientation promotes shedding of solids toward the center and bottom of ash settling section 56. This enables collected particles to flow along the plates by gravity and fall into the bottom zone where the submerged chain conveyor can remove them. Plates 90 may be hung from stringers 89 or by other means. In FIG. 20 another feature of the present invention is depicted; namely, that stacked plates 90 are provided in a series of the separate modular plate groups. In this embodiment, three separate stacked plate groups of stacked plates 92, 94, and 96 are provided with baffles 80 interposed between them as illustrated diagrammatically by FIG. 21 (not visible in FIG. 20). As discussed in connection with prior embodiments, baffles 80 prevent a strong bottom density current from occurring as illustrated in FIG. 17, and forces the flow pattern to distribute vertically along the channels defined by the stacked plate arrays 92, 94, and 96. Although three separated arrays of stacked plates 92, 94 96 are illustrated, a fewer number may be used along with one or more baffles. It is believed optimal that at least two stacked plate groups 92 and 94 are provided with at least one baffle 80 positioned between the stacked plate groups.

Figure 22:
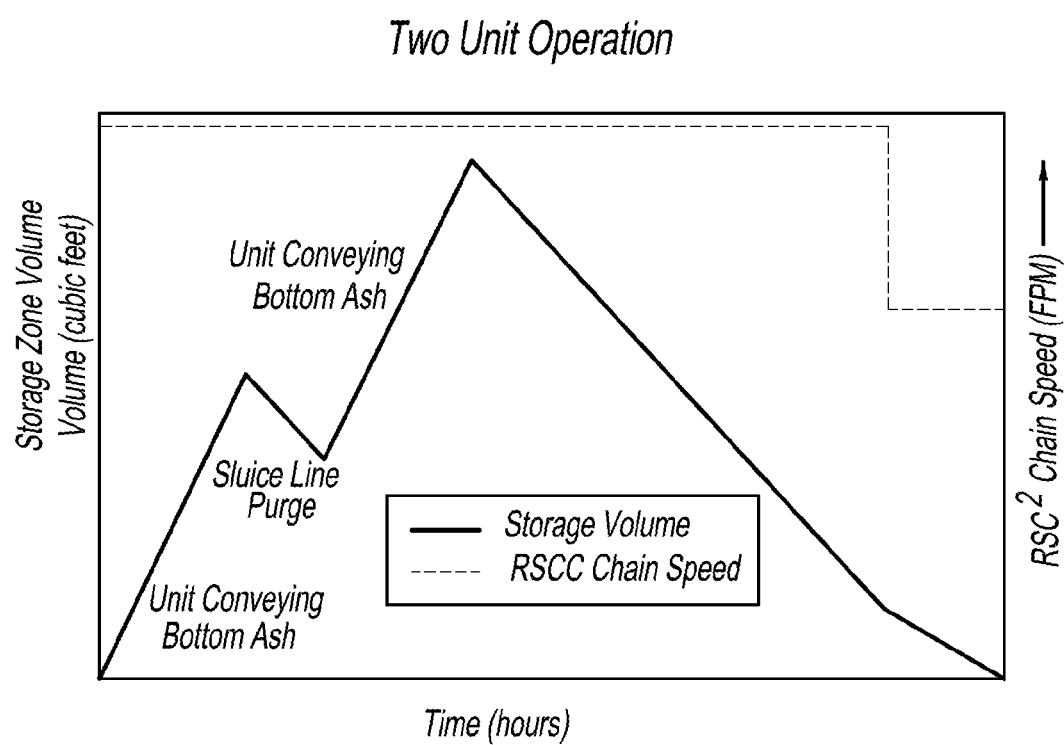
FIG. 22 is a graph representing operation of a single RSCC in accordance with this invention servicing two separate boiler units.

Now with reference to FIG. 22, design principles for a system including RSCC 50 are described. The Figure is related to a system having one RSCC 50 servicing two boiler units 15. For an implementation of this invention, ash holding section 52 is sized according to the ash conveyance rate defined by the ash production rate, the convey time and the conveyance frequency. Additional factors are the ash density and the speed of drag chain 64. Referring again to FIG. 22, as the first boiler unit 15 conveys bottom ash, the volume accumulates in the ash holding section 52 because the rate at which solids are entering the tank is greater than the rate at which they are being removed by the drag chain 64. When the first boiler unit 15 is finished (for example after 2 hrs.), a period of purging of the sluice lines (slurry discharge pipe 58) with water follows (for example for 30 minutes) and the drag chain 64 continues to run, evacuating some of the settled ash. When the second boiler unit 15 begins to convey bottom ash which results in a net accumulation of ash volume in the ash holding section 52 (again for example for 2 hrs.). The volume of accumulated ash when both boiler units 15 are finished conveying for that shift determines the required volume of ash holding section 52. At this point the remaining time in the cycle (for example about 7.5 hrs. for a 12 hr. cycle time) is used to evacuate all the solids in the ash holding section 52. Depending on the quantity of solids to be removed and the time until the first boiler unit 15 conveys again, the chain speed of drag chain 64 (shown by the dotted line in the figure) may be slowed during this time to minimize agitation in the ash settling section 56.

In addition to the features mentioned previously, a RSCC 50 in accordance with this invention may also incorporate the following features and applications:

1. The RSCC 50 is a dewatering device that functions as a thickener for dewatering solids and as a clarifier for purifying the process water.
2. The RSCC device 50 can be used for solid dewatering and water purification for any type of solid/liquid slurry, including but not limited to coal bottom ash.
3. The RSCC 50 can be placed at any physical location in a process involving water recycling.
4. For power plants application, the RSCC 50 is preferably placed at a location distant from the boiler 15 to preserve space for other processes.
5. For low flow applications, e.g. <100 gpm, the RSCC 50 may be a mobile unit that can be transported to multiple sites.
6. The RSCC 50 can handle slurry with wide range of flow (10,000>X>50 gpm), solids concentration (10%>x>0.01%), and particle size distribution (2 in.>X>1 micron).
7. The RSCC 50 cross sectional shape through ash settling section 56 may be constant across the length of the ash settling zone or varied. Requirements for the ash holding section 52 may be such that a large volume is need for accommodating relatively large load. The ash settling section 56 may not require such a large area to settle the fines, or vice versa.

While the above description constitutes the preferred embodiment of the present invention, it will be appreciated that the invention is susceptible to modification, variation and change without departing from the proper scope and fair meaning of the accompanying claims.

The invention claimed is:

1. A remote submerged chain conveyor system for separating particles from a coal ash/water slurry conveyed from one or more remotely located boiler units, comprising;

a tank forming an ash holding section, a dewatering section, and an ash settling section, the ash holding section adapted for receiving the slurry and defining first and second opposite ends, the dewatering section extending from the first end of the ash holding section and including an incline for dewatering the slurry, the ash settling section extending from the second end of the ash holding section, the ash settling section in the form of an elongated trough connected with the ash holding section at a proximal end and having a discharge drain trough at near an opposite distal end, the ash holding section, the dewatering section, and the ash settling section being oriented in a generally linear arrangement wherein a net flow of water from the ash/water slurry is in a direction from the proximal end, through the ash settling section, toward the distal and, and out of the drain trough, a drag chain moving along the bottom of the ash settling section and the ash holding section and along the dewatering section and conveying the particles settling from the slurry to the dewatering section, and a containment plate positioned between the ash holding section and the ash settling section and having perforations for containing accumulated particles in the ash holding section.

2. The remote submerged chain conveyor in accordance with claim 1, wherein the drain trough is displaced from the distal end.

3. The remote submerged chain conveyor in accordance with claim 2, wherein the drain trough is displaced from the distal end by a distance $L_4$ in the range $0.1L<L_4<0.15L$, where L is the length of the tank.

4. The remote submerged chain conveyor in accordance with claim 1 further comprising the ash settling section having a generally hexagonal cross-sectional shape.

5. The remote submerged chain conveyor in accordance with claim 1 further comprising the ash settling section having a generally quadrilateral cross-sectional shape.

6. The remote submerged chain conveyor in accordance with claim 1 further comprising at least one baffle positioned in the ash settling section between the proximal and distal ends and extending across the width of the ash settling section and from a lower portion of the ash settling section within the water column retained in the ash settling section.

7. The remote submerged chain conveyor in accordance with claim 6 further comprising the at least one baffle having a height being less than one-half the height of the water column and causing the flow of the slurry to move up and over an upper edge of the baffle.

8. The remote submerged chain conveyor in accordance with claim 6 further comprising at least two of the baffles provided in the ash settling section and separated along the ash settling section.

9. The remote submerged chain conveyor in accordance with claim 6 further comprising at least three of the baffles provided in the ash settling section.

10. The remote submerged chain conveyor in accordance with claim 6 further comprising at least one of the baffles having a first height and at least a second of the baffles having a second height different from the first height.

11. The remote submerged chain conveyor in accordance with claim 10 further comprising the first and the second height each been less than one-half the height of the water column.

12. The remote submerged chain conveyor in accordance with claim 6 further comprising the at least one baffle having a generally planar and vertically oriented main section with an upper lip bent toward the direction of flow of the water.

13. The remote submerged chain conveyor in accordance with claim 6 further comprising the at least one baffle in the form of a generally planar plate having a plurality of apertures therethrough and extending substantially the entire height of the water column.

14. The remote submerged chain conveyor in accordance with claim 1 further comprising the ash settling section including at least one array of stacked plates which generally overlie one another when viewed from the vertical direction.

15. The remote submerged chain conveyor in accordance with claim 14 further comprising the at least one array of stacked plates oriented at an angle skewed from horizontal.

16. The remote submerged chain conveyor in accordance with claim 14 further comprising the at least one array of stacked plates forming a pair of sub-arrays symmetrically oriented about a vertical plane passing through the longitudinal center of the settling zone, each of the sub-arrays inclined downwardly toward the vertical plane.

17. The remote submerged chain conveyor in accordance with claim 16 further comprising the sub-arrays separated at the vertical plane.

18. The remote submerged chain conveyor in accordance with claim 14 further comprising at least a first and a second array of stacked plates separated from one another longitudinally along the settling zone.

19. The remote submerged chain conveyor in accordance with claim 18 further comprising the settling zone including at least one baffle extending from a lower region of the ash settling section in the water column toward the upper level of the water column contained in the ash settling section, the baffle breaking up bottom currents along the bottom of the drain trough.

20. The remote submerged chain conveyor in accordance with claim 19 further comprising the at least one baffle placed between the first and the second array of the stacked plates.

21. A remote submerged chain conveyor for separating particles from a coal ash/water slurry conveyed from one or more remotely located boiler units, comprising;
   a tank forming an ash holding section, a dewatering section, and an ash settling section, the ash holding section adapted for receiving the slurry, and the defining first and second opposite ends,
   the dewatering section extending from the first end of the ash holding section and including an incline for dewatering the slurry,
   the ash settling section extending from the second end of the ash holding section, the ash settling section in the form of an elongated trough connected with the ash holding section at a proximal end and having a discharge discharge drain trough at near an opposite distal end, the ash holding section, the dewatering section, and the ash settling section being oriented in a generally linear arrangement wherein a net flow of water from the ash/water slurry is in a direction from the proximal end, through the ash settling section, toward the distal and out of the drain trough,
   a drag chain moving along the bottom of the ash settling section and the ash holding section and along the dewatering section and conveying particulates settling from the slurry to the dewatering section,
   at least one baffle positioned in the ash settling section extending across the width of the ash settling section and from a lower portion of the ash settling section within the water column retained in the ash settling section, the at least one baffle causing the flow of the slurry to move up and over an upper edge of the baffle, and
   the ash settling section including at least one array of stacked plates which generally overlie one another when viewed from the vertical direction.

22. A method of operating a power plant coal bottom ash transfer system having at least a first and a second boiler unit comprising the steps of:
   providing a remote submerged chain conveyor system located remotely from the first and the second boiler units and having a tank forming an ash holding section, a dewatering section, and an ash settling section, the ash holding section adapted for receiving the slurry and defining first and second opposite ends, the dewatering section extending from the first end of the ash holding section and including an incline for dewatering the slurry, the ash settling section extending from the second end of the ash holding section, the ash settling section in the form of an elongated trough connected with the ash holding section at a proximal end and having a discharge drain trough at near an opposite distal end, the ash holding section, the dewatering section, and the ash settling section being oriented in a generally linear arrangement wherein a net flow of water from the ash/water slurry is in a direction from the proximal end, through the ash settling section, toward the distal and, and out of the drain trough, and a drag chain moving along the bottom of the ash settling section and the ash holding section and along the dewatering section and conveying the particles settling from the slurry to the dewatering section,
   conveying bottom ash from the first boiler to the ash holding section,
   conveying bottom ash from the second boiler to the ash holding section, and
   operating the remote submerged chain conveyor to separate particulates from the slurry received from the first and the second boilers.

23. The method of claim 22 further comprising modulating the speed of the drag chain in response to the load of the slurry transferred from the first and the second boilers.

24. The method of claim 22 further comprising bottom ash from the first boiler unit to the ash holding section at a different time than conveying bottom ash from the second boiler unit to the ash holding section.

* * * * *